US008448133B2

(12) United States Patent
Malkin et al.

(10) Patent No.: US 8,448,133 B2
(45) Date of Patent: May 21, 2013

(54) SOFTWARE DEVELOPMENT, DEPLOYMENT AND EVOLUTION SYSTEM, METHOD AND PROGRAM PRODUCT

(75) Inventors: Peter K. Malkin, Yorktown, NY (US); Peri L. Tarr, Yorktown, NY (US); Clay E. Williams, Yorktown, NY (US)

(73) Assignee: International Business Machines Corporation, Armonk, NY (US)

( * ) Notice: Subject to any disclaimer, the term of this patent is extended or adjusted under 35 U.S.C. 154(b) by 533 days.

(21) Appl. No.: 12/787,923

(22) Filed: May 26, 2010

(65) Prior Publication Data
US 2010/0333063 A1  Dec. 30, 2010

Related U.S. Application Data

(60) Provisional application No. 61/220,191, filed on Jun. 24, 2009.

(51) Int. Cl.
*G06F 9/44* (2006.01)
(52) U.S. Cl.
USPC ............ 717/107; 717/122; 717/127; 717/172
(58) Field of Classification Search
USPC .......... 717/104–109, 120–178; 719/328–331; 715/744–788; 709/203–220
See application file for complete search history.

(56) References Cited

U.S. PATENT DOCUMENTS

| 8,082,538 | B2* | 12/2011 | Hinchey et al. | 717/104 |
| 8,266,591 | B2* | 9/2012 | Brown et al. | 717/124 |
| 2007/0157192 | A1* | 7/2007 | Hoefler et al. | 717/168 |
| 2007/0240147 | A1* | 10/2007 | Bernabeu-Auban et al. | 717/170 |
| 2008/0263506 | A1* | 10/2008 | Broadfoot et al. | 717/104 |
| 2009/0089753 | A1* | 4/2009 | Yoshimura et al. | 717/121 |
| 2009/0138292 | A1* | 5/2009 | Dusi et al. | 705/7 |

FOREIGN PATENT DOCUMENTS
WO    WO 0020968 A2 *   4/2000

OTHER PUBLICATIONS

Lehman, Programs, Life Cycles, and Laws of Software Evolution, Proceedings of the IEEE, vol. 68, No. 9, Sep. 1980, pp. 1060-1076.*
Ramamoorthy, Testing Large Software With Automated Software Evaluation Systemst, fetched from www.acm.org, on Dec. 6, 2012, pp. 382-394.*
Graham, A Software Design and Evaluation System, ACM, 1973, vol. 16, the ACM No. 2, pp. 110-116.*

* cited by examiner

*Primary Examiner* — Wei Zhen
*Assistant Examiner* — Satish Rampuria
(74) *Attorney, Agent, or Firm* — Law Office of Charles W. Peterson, Jr.; Louis J. Percello, Esq.

(57) ABSTRACT

A method of software evolution, software evolution system and program product therefor. A context specification handler stores context specifications describing requirements on context-adapted software. A Software Part Semantics Specification (SPSS) handler stores software part semantics specifications. A Software Implementation (SI) handler stores SIs. Behavior History handler stores a history of active software behavior analysis results of monitoring previous versions. A software rendering handler combines software behavior history with context specification, software part semantics specifications and SIs and distributes (and optionally deploys) context-adapted software. A software inspector continuously monitors context behavior of deployed versions and selectively identifies active context-adapted software failing to satisfy context specification for reassembly of a new version(s).

18 Claims, 4 Drawing Sheets

Control-centric

```
public class Hello {
    public void world() {
        System.out.println("Hello
            world");
    }
}
```

Data-centric

```
<class name="Hello">
    <method name="world"
        requires="print">
        <print text="Hello world"/>
    </method>
</class>
```

108

1120  Java.css
    class { ... }
    method { ... }
1122  Ruby.css
1124  SimplePrint.css
    print { ... }
1126  FancyPrint.css

SOFTWARE DEVELOPMENT, DEPLOYMENT AND EVOLUTION SYSTEM, METHOD AND PROGRAM PRODUCT

CROSS REFERENCE TO RELATED APPLICATION

The present invention is a continuation in part of Provisional U.S. Patent Application No. 61/220,191, entitled "SOFTWARE DEVELOPMENT, DEPLOYMENT AND EVOLUTION SYSTEM, METHOD AND PROGRAM PRODUCT" to Peri L. Tan et al., filed Jun. 24, 2009 assigned to the assignee of the present invention and incorporated herein by reference.

FIELD OF THE INVENTION

The present invention generally relates to evolving software to meet changing needs and distributing the evolved software; and more particularly, to monitoring active software and creating up to date versions of evolved software to meet changing needs for the software and distributing the evolved software in a "data-centric" manner.

BACKGROUND DESCRIPTION

Typically, software developers write applications, software systems, and services in one or more particular programming languages, using programming models geared for a fixed set of target contexts and usages. The software is then compiled, distributed and deployed as a full blown application. Whenever a particular application proves useful, its use may extend well beyond its planed life, e.g., the life of the particular language and model. Moreover, users may find uses in a variety of contexts that extend well beyond what the software developer(s) intended and anticipated. So, successful software may well outlive its original programming language(s), models and paradigm(s); some or all of the original software stack; and even, the original operating system(s), middleware and hardware on which it was based and for which was developed. Consequently, evolving—or even maintaining—such software has become increasingly expensive and problematic.

There have been a small number of techniques available to developers for making software more adaptable in somewhat limited ways. Developers may offer software in what are known as Software Product Lines (SPLs) that are designed with variation points in particular parts of the software to anticipate expected needs. As a simple example, a SPL may have an open point for adding new printers based on the assumption that all printers support Portable Document Format (PDF). The developers would be unable to extend that particular SPL to print to a Postscript printer.

Alternately, developers have used what is known as dynamic loading and dynamic weaving to provide applications capable of what is known as dynamic adaptation. Dynamic adaptation is a different technique for enabling software to work in contexts other than what it is originally developed for. More particularly, dynamic adaptation involves loading one piece of software (replacement) that replaces a functionally equivalent or similar part of an existing piece of software.

Dynamic loading involves removing a part of a running software system (a library, a component, a class, or other unit of functionality) from memory, loading a replacement, and redirecting subsequent usage from the replaced software to the replacement. Dynamic weaving involves modifying parts of running software to add or remove functionality, without need for recompilation or restarting the running software. Both dynamic loading and dynamic weaving are limited, invasive and involve potentially hazardous actions. Both techniques, for example, very easily introduce errors into running software. Failing to provide fully compatible replacement components, can cause software to produce erroneous results, go into infinite loops (cause a computer to slow down or crash), hang, or otherwise crash entirely.

Equally problematic is the cost of providing "life support" and experienced support personnel and resources, which increases with the age of the application being supported. As time passes, the size of the pool of people with skills required to maintain older software and its requisite infrastructure declines. Experienced developers are expensive, charging more for the experience. Neophyte (cheaper) developers normally train for the state of the art, ignoring outdated languages and technologies that may be necessary for maintaining the software in its required environment, i.e., providing life support.

Previously, the only alternative to continuing expensive life support was rewriting software using newer technologies. This has required extensive knowledge of new technologies, of existing software and older technologies on which the software depends, as well as knowledge of how the particular application is deployed and post-deployment operating conditions. Also, most real state of the art software is very large and complex and does extremely significant, complex things. New development is time consuming, and requires major resource expenditures, i.e., people, money, software and hardware. Consequently, previously it took at least as many people and the same level of resources to rewrite new versions of software and to ensure that new versions functioned correctly. Moreover, typical redevelopment is very likely to introduce new bugs that, potentially, cause tremendous impact on both the software users and software owners. Unfortunately, both maintaining life support and rewriting software are extremely expensive and risky alternatives.

How successful software is determines the eventual range of contexts of its use. Successful software, especially software that solves an important, ubiquitous problem, may be used and reused in a wide range of unforeseeable contexts. Consequently, planning for its reuse is very likely inadequate. Planning for variations of particular software adds to design, implementation, maintenance, evolution, test and qualification time. This all increases development and maintenance costs. When developers can predict variants with a high degree of accuracy, this cost increase may be acceptable and preferable. However, when the predictions are wrong—as they very often are—the normal result is more complex software that is unnecessarily more difficult to maintain, evolve, and adapt than it would have been otherwise, i.e., if unused variation points had not been included.

Moreover, deploying a rewrite or new version of successful software, further extends the life of the software and is likely to continue the need for further rewrites. So after deploying rewritten software, if it works well and addresses a more ubiquitous need, it may be necessary to continue evolving the software as new contexts arise. This increases the likelihood that others will take and deploy newer versions into other contexts that the developers and/or redevelopers did not originally anticipate. Consequently, adapting and modifying software for each new context has been a time-consuming and error-prone task; long-term maintenance and subsequent software evolution tends to be a nightmare. This is especially true since the above previous solutions usually required invasive modification, adapting software statically for new contexts, either manually or by using technology, e.g., aspect-oriented programming.

Thus, there is a need for simplifying extending the life of existing software and for simply and seamlessly recreating and redeploying software that addresses evolving needs that extend beyond original design goals.

SUMMARY OF THE INVENTION

It is a purpose of the invention to reduce maintenance costs of useful software;

It is another purpose of the invention to reduce costs of evolving useful software;

It is yet another purpose of the invention to reduce the development costs of new versions or iterations of existing software;

It is yet another purpose of the invention to make software malleable and adaptable;

It is yet another purpose of the invention to produce software that is more readily adapted/evolved to new and evolving contexts throughout the lifetime of the software;

It is yet another purpose of the invention to make software that more readily is adapted to new and evolving contexts while reducing or removing sources of otherwise ever-increasing maintenance and evolution costs;

It is yet another purpose of the invention to produce malleable, adaptable software that is easier to evolve for unanticipated uses and in different and unforeseeable contexts while minimizing maintenance costs;

It is yet another purpose of the invention to allow software developers to reuse software in multiple programming languages, and adapted for contexts that extend well beyond the original contexts for which it was originally created.

The present invention relates to a method of software evolution, software evolution system and program product therefor. A context specification handler stores and manages context specifications, this management including the creation and addition of the context specification, the modification of existing context specifications, the deletion of existing context specification, as well as the listing and retrieval of existing context specifications. The context specifications describe software environment requirements and constraints and provide instructions for assembling the software from a set of Software Part Semantics Specifications (SPSSs). An SPSS handler stores and managers all software part semantics specifications, this management including creation, modification, deletion and retrieval of software part semantics specifications. Software Implementations (SIs) describe how a given software part can be implemented. An SI handler stores SIs. A Behavior History handler stores a history of results of software behavior analysis of previous versions of active context-adapted software. A software rendering handler takes as input a set of SPSSs from a SPSS handler, a context specification from context specification handler describing the intended context in which the resulting context-adapted software version will run, and behavioral history of the software from any previous versions. Then, the software rendering handler assembles and may distribute resulting context-adapted software. An inspection handler continuously monitors the active (new) version and analyzes behavior and execution characteristics, e.g., performance, scalability, failure rate, availability, etc. If the inspection handler discovers that the active context-adapted software is not addressing the requirements specified in its context specification, the inspection handler refers the context-adapted software back to the software rendering handler. The software rendering handler reassembles a new version of context-adapted software, better adapted for the context in which it is used.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
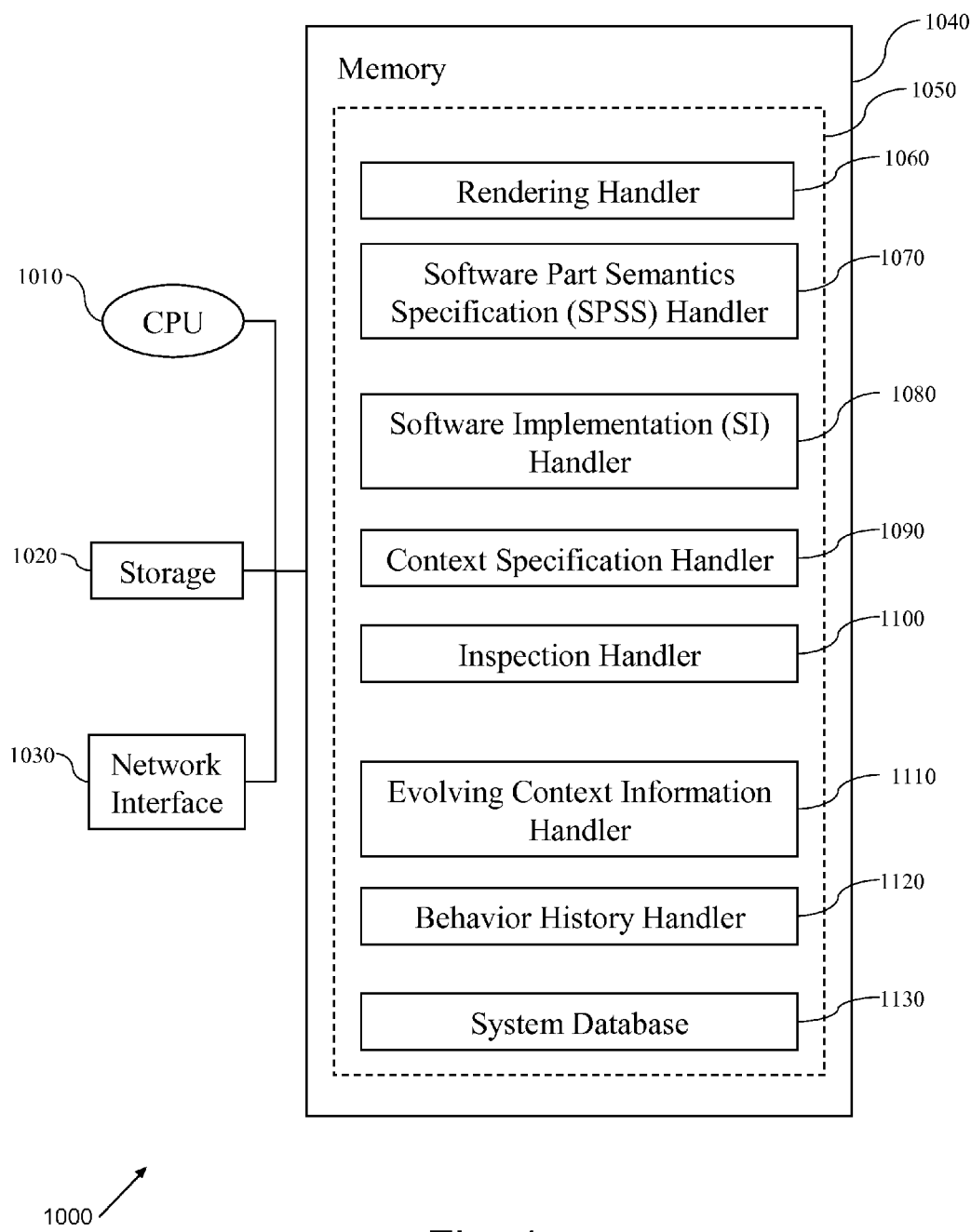
FIG. 1 shows a block diagram of an example of a context-adaptive software evolution system according to one embodiment of the present invention.

Turning now to the drawings and, more particularly, FIG. 1 shows an example of a context-adaptive software evolution system 1000 according to a preferred embodiment of the present invention. Preferably, context-adapted software is created, evolved and deployed in a "data-centric" manner. In particular, developers write data-centric software such that semantics are separated from function analogous to using Cascading Style Sheets (CSS) to separate document content from document presentation in creating Hypertext Markup Language (HTML) based web pages. Thus, developers write semantics-oriented Software Part Semantics Specifications (SPSSs) that describe intended semantics of the software parts without specifying any details about how those semantics are realized. The SPSSs may describe the semantics of pieces of software of any size (small, medium, or large) that are intended, not as a final product, but as components of context-adapted software product or products. Preferably, the SPSSs are free from context or programming language-specific details.

Software Implementations (SIs) supply implementations for the SPSSs. A given SI indicates how to accomplish the task described by a given SPSS. In particular, the SIs provide behavioral semantics, analogous to visual presentation semantics that CSS provides. For example, some SIs may effectively provide the semantics of modern-day programming languages (e.g., Java CSS-type semantics or a C# CSS-type semantics); others may provide library-like services, such as mathematical capabilities and messaging services. Thus, advantageously, the present invention simplifies retargeting existing software to a more modern programming language, non-invasively by replacing the particular SI.

So, for example, a phrase intended emphatically may be represented in HTML as <em>I really mean business!</em>. How the text is rendered depends on the context in which the text will appear. One CSS realization of <em> might produce an italicized version, I really mean business! Another realization might produce a version of the text in flashing red letters or bold. This separation between HTML (where the intended text semantics are described by markup) and CSS (which specifies the realization of that markup) allows multiple different renderings of the same text without having to modify the HTML. Thus, there are multiple SIs can fulfill the requirements of a given SPSS.

As shown in the example of FIG. 1, the system 1000 may include any suitable computing node that is able to load and execute programmatic code, including, but not limited to: products sold by IBM such as ThinkPad® or PowerPC®, running the operating system and server application suite sold by Microsoft, e.g., Windows® XP, or a Linux operating system. The system logic 1050 is preferably embodied as computer executable code that is stored and loaded from a remote source (e.g., from a network file system), local permanent optical (CD-ROM), magnetic storage (such as disk), or storage 1020 into memory 1040 for execution by CPU 1010. The system 1000 may also include a data network interface 1030, through which the system 1000 can communicate. Such an interface 1030 may include, but is not limited to a hardwired one, e.g., Ethernet over coax cable, wireless IP, and telephone to IP (VoIP), such as that provided by the DVG-1402S Broadband Phone Service VoIP Router from D-Link®. Preferably, as will be discussed in greater detail below, the memory 1040 includes computer readable instructions, data structures, program modules and application interfaces forming the following components: a rendering handler 1060, a software parts semantics specification (SPSS) Handler 1070, a software implementation specification (SI) handler 1080, a context specification handler 1090, an inspection handler 1100, an evolving context information handler 1110, a behavior history handler 1120, and a system database 1130.

Handlers 1070-1120 are described in detail with reference to FIG. 2, with the rendering handler 1060 being described in detail with reference to FIG. 3. The system database 1130, in one embodiment, provides for creation, deletion and modification of persistent data, and is used by all of the handlers 1060-1120. An example of a product providing such function includes IBM DB/2 database system. It should be noted that the system database 1130 may be local or on another network accessible node. Further, one or more handlers 1060-1120 may include a dedicated independent database. Thus, a single shared database is not required.

Figure 2:
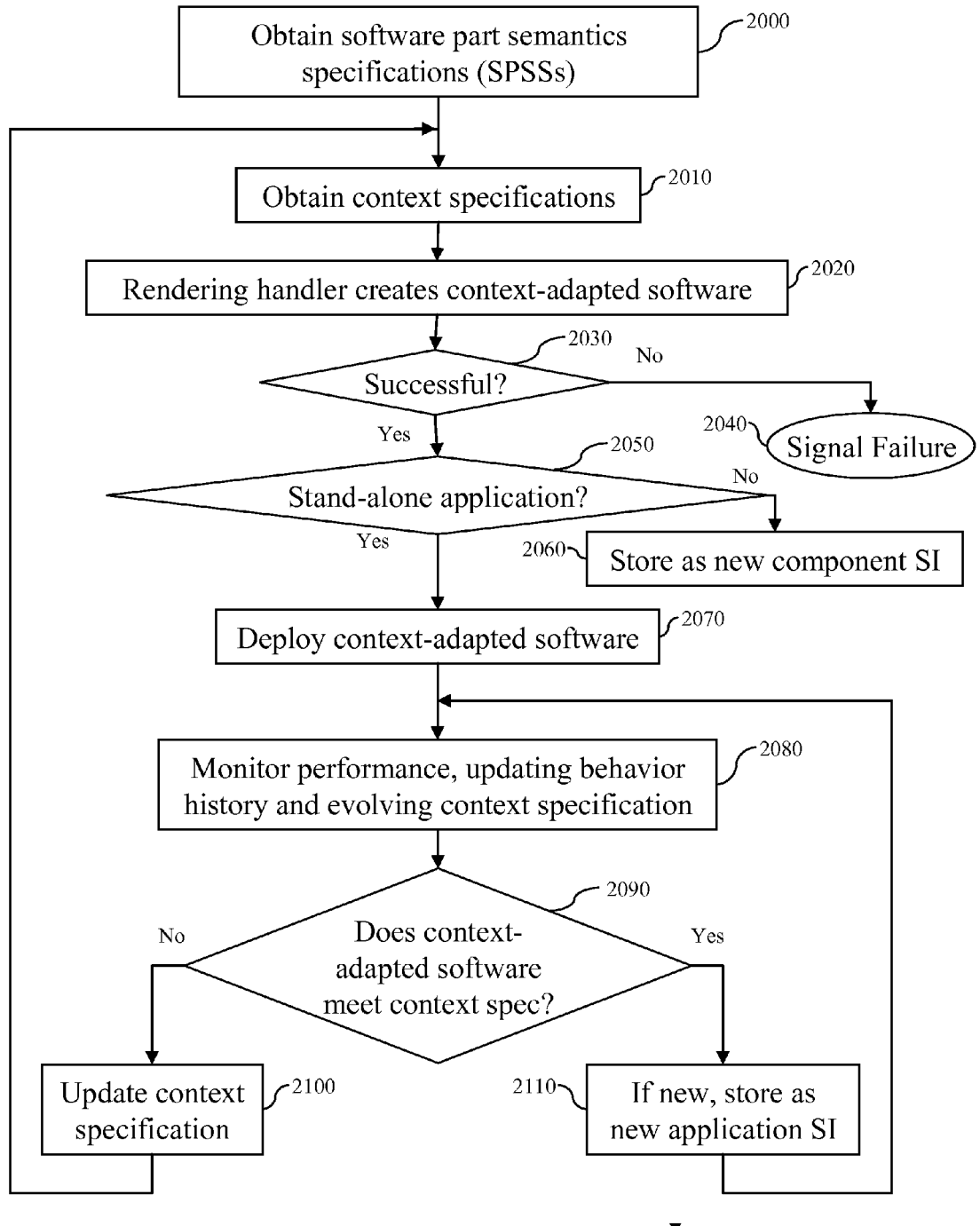
FIG. 2 shows an example of the flow control of a context-adaptive software evolution system according to one embodiment of the present invention.

FIG. 2 shows an example of control flow of through logic 1050 of the context-adapted evolution system 1000 in an embodiment of the current invention. FIG. 2 also provides an overview example of context-adapted software evolution according to a preferred embodiment of the present invention. In step 2000, a software developer(s) selects(select) all of the relevant Software Part Semantics Specifications (SPSSs) from the SPSS handler 1070, adding in any new required SPSSs first. As described above, the SPSSs describe what the software parts are to do without specifying any details about how the result is realized. The selected SPSSs are then passed to the rendering handler 1060.

So, in step 2010, all of the context specifications for context-adapted software are selected from the context specification handler 1100, any new needed specifications being added first. These context specifications describe the specific context requirements on the context-adapted software, such as performance requirements, network configuration and expected load. The context specifications also describe the context in which the assembled software must operate or run and drive software assembly. Multiple possible realizations are allowed for any particular application (e.g., PC, Mac®, Unix®, Linux) through the definition of different CSS-like context specifications. Preferably, all context specifications are stored in a context specification handler 1090. The handler 1090 allows for the creation, modification and retrieval of context specifications. New specifications can be added by developers. Further, users and developers may change software requirements over time. So, the inspection handler 1100 may change and update context specifications, when the inspection handler 1100 identifies changes and updates. In step 2010, context specification handler 1090 returns all selected context specifications to the rendering handler 1060. Next in step 2020, the rendering handler 1060, attempts to create context-adapted software providing the semantics indicated by the selected SPSSs, and fulfilling the returned context specification. This is described in more detail hereinbelow with reference to FIG. 4.

Figure 3:
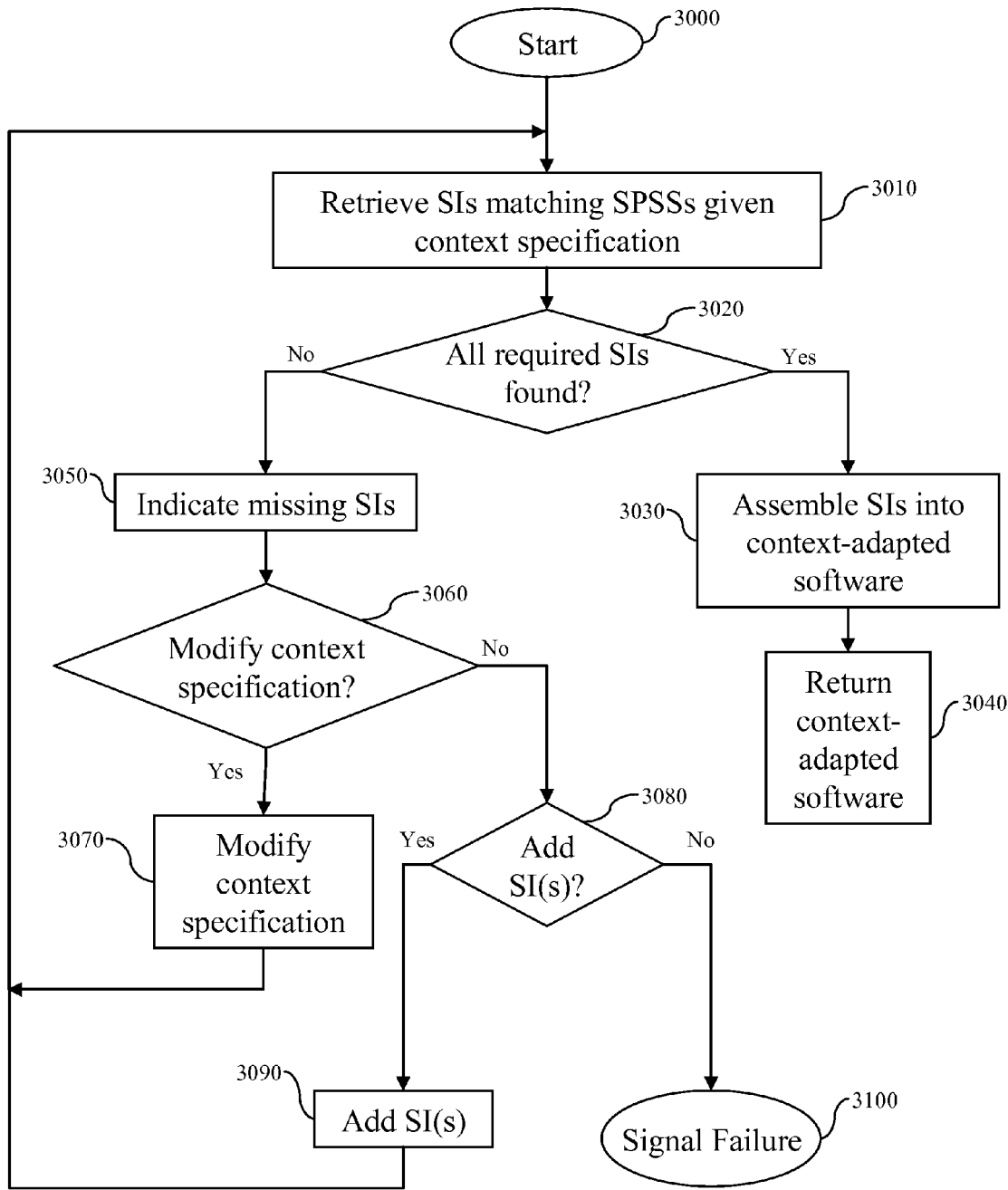
FIG. 3 shows an example of the flow control of a rendering handler according to one embodiment of the present invention.

As shown in FIG. 3, in step 3010, the rendering handler 1060, guided by the selected context specifications, attempts to select statically or dynamically, the software implementations (SIs) that accomplish the specified SPSSs. Since one or more of the needed SIs might not be available from the SI handler 1080; in step 3020, the rendering handler 1060 checks whether all of the necessary SIs have been retrieved. For example, although there may be SIs in Java1.1 and Java1.3 which provide a particular mathematical calculation, one might not be implemented in Java 2. Thus, if Java 2 were the specified programming language in the context specification, no SI for the given mathematical calculation would be available.

Whenever all SIs are found, in step 3030 the rendering handler 1060 assembles the retrieved SIs into context-adapted software (e.g., a stand alone application or a component). The context-adapted software may be fixed in any suitable physical medium for distribution, for example, in magnetic storage, Compact Disks (CDs), Digital Versatile Disks (DVDs), flash storage, or transferred over a network (not shown) to/from client local storage. Next in step 3040, the rendering handler 1060 returns this new software element. Alternatively, if any required SIs are not found, then in step 3050 an indication is provided of which SPSS cannot be matched and why. So, for the example above, the indication indicates that an implementation for the given mathematical calculation implemented in Java 2 cannot be found.

After indicating missing SPSSs, in step 3060 the context specification is checked to determine whether to modify the context specification to resolve the problem. If modification is selected, then in step 3070, the developer(s) can modify the current context specification, e.g., relaxing the requirement for Java 2, to Java 1.3. If in step 3060, however, modifying the context specification is not selected, then in step 3080 a check is made whether the missing/required SI(s) will be provided. Such SIs can be provided either manually by a developer or automatically, e.g., from a search for SIs, for example, from public $3^{rd}$-party SIs repositories. If the missing/required SI(s) can be provided, then in step 3090, the required SIs are added to the SI handler 1080. After resolving the problem either by modifying 3070 the context specification or by providing 3090 the missing/required SI(s); returning to step 3010, the rendering handler again tries to find SIs that provide the semantics specified by the given SPSSs and that fulfill the context specification. If adding the required SIs is denied in step 3080, then in step 3100 the rendering handler 1010 signals failure. Thus advantageously, software function (SPSSs) is disentangled from the particular software implementation (SIs) describing the particular programming language in which each implementation is expressed and from the particular context in which the implementations may run.

Advantageously, the rendering handler 1060 can also check whether all of the necessary SPSSs are available from the SPSS handler 1070. For example, one SPSS specified in step 2000 may be or include an invocation by an object A of method P. If in this example, the SPSS handler 1070 has no definition of method P for object A, a preferred embodiment makes this determination and posts an alert.

Returning to FIG. 2, in step 2030 the rendering handler 1060 checks whether it was successful in creating the context-adapted software. If not, in step 2040 failure is signaled and assembly ends. Otherwise, when context-adapted software is created successfully, the rendering handler 1060 checks in step 2050 whether the context-adapted software can be run on its own, e.g., as a full application. If not, as with a single library function, in step 2050, the rendering handler 1060 passes the context-adapted software to the SI handler 1080 to be stored as a new component SI for use as a subcomponent in future software projects. Otherwise, in step 2070, the context-adapted software may be deployed (active) on any appropriate single device (e.g., a personal computer (PC), a server, a phone), a collection of devices (e.g., a distributed network), or as a service in what is well known as "the Cloud."

Once deployed 2070, the inspection handler (e.g., 1100 in FIG. 1) monitors 2080 the performance and behavior of the context-adapted software. The inspection handler 1100 may be a human inspector or, preferably, a suitable computer application. The inspection handler 1100 updates the behavior history of the context-adapted software, saving the data using the behavior history handler 1120. The inspection handler 1100 also updates the evolving context specifications, saving the relevant data using the evolving context specification information handler 1110.

For example, the specified context specification may indicate that the context-adapted software has to support only 1,000 concurrent users. If the inspection handler 1100 finds that 100,000 concurrent user are frequently active, it would store this fact using the evolving context information handler 1110. Any and all other such context specification discrepancies would also be stored using the evolving context information handler 1110. It should be noted that once updated, and for any subsequent reassemblies, the rendering handler 1060 can also use the information held by the behavior history handler 1120. The evolving context information handler 1110 guides selection of SIs for reassembly into a new version. Each new version is better adapted for the context in which the previous/current version is used. Use of latest behavior data and context information insures that the new version of the context-adapted software satisfies the current context specifications.

So in step 2090, the inspection handler 1100 checks whether the context-adapted software's performance satisfies the requirements described by the specified context specification. If so, the context-adapted software is passed to the SI handler 1080 and saved in step 2110 as a new implementation—an application SI—if the current implementation has not already been saved. Then, returning to step 2080, the inspection handler 1100 monitors the context-adapted software's behavior and performance.

Alternatively, if the inspection handler 1100 finds that the context-adapted software fails to meet the context specifications in step 2090, the inspection handler 1100 first updates the context specification in step 2100 using the context specification handler 1090. The context specification updates provided in step 2100 include any new specification information stored in the evolving context information handler 1110 (e.g., that the context-adapted software must support 100,000 concurrent users, rather than just 1,000). Then, returning to and proceeding from step 2010 the rendering handler 1060 retrieves up-to-date context specifications from the context specification handler 1090.

It should be noted that through the updates to the context specification in step 2100, the inspection handler 1100 communicates new and/or updated context requirements to the rendering handler 1060 for a new version of the context-adapted software. For example, if the inspection handler 1100 finds at step 2080 that the context-adapted software frequency crashes from lack of memory; the inspection handler 1100 can update the context specification to require a greater amount of available memory. The inspection handler 1100 also may determine (via an error messages) when the context-adapted software is using a now-obsolete version of a given protocol or language (e.g., Java 1.3 rather than Java 2.0). In response, the inspection handler 1100 can update or change the context specification to include the requirement for a newer version. Further, the inspection handler 1100 can invoke the rendering handler 1060 to assemble a new version of the context-adapted software, a version more likely to address the context specification requirements, returning the process 1050 to step 3020.

It should also be noted that while the context-adapted software's performance checks in step 2090 may succeed for a time, the checks may eventually fail due to changes over time in the deployment environment. For example, suppose that although the context-adapted software runs without interruption for several weeks, but then, due to increased usage load begins to crash and requires restarts several times a day. Since eventually this degradation would not meet the requirement for 24×7 availability, the inspection handler's 1100 check would fail at step 2090 and the context specification would be updated in step 2100.

Again, the rendering handler 1060 is invoked to create a new version back up in step 2020. The changes in the specification and deployment environment are available as updates to the rendering handler 1060 from the context specification handler 1090, the behavior handler 1120 and evolving context information handler 1110 that were updated by the inspection handler 1100. Further, since none of the context-specific requirements are built into the SPSSs, the SPSSs can be considered "pure." So, the rendering handler 1060 can choose different SIs, based on the actual behavioral information the inspection handler 1100 provides for the current version. Then, using the same or some variation of the same SPSSs, the rendering handler 1060 assembles a new version. The new version, and any subsequent versions are thus directed to the actual contextual requirements, e.g., reflected in feed back from the inspection handler 1100 in the context specification and behavior history.

Figure 4A:
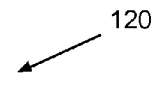
FIGS. 4A-B show a comparison between an example of a previous approach to creating and deploying software with an example of creating, evolving and deploying software according to one embodiment of the present invention.
Figure 4B:
Figure 4B:
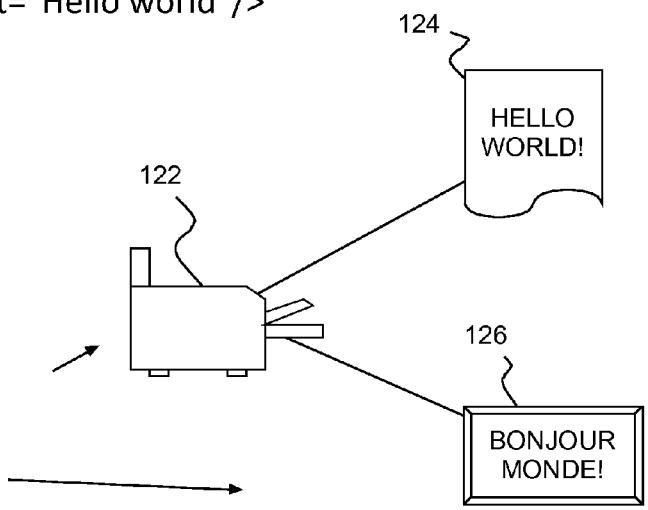

FIGS. 4A-B show a comparison between an example of a previous approach 120 to creating and distributing software with an example of creating, evolving and distributing software 112 according to a preferred embodiment of the present invention. Previously, as shown in the control-centric example of FIG. 4A, the software developer produced software 120 that produces a single application, e.g., printing "Hello World" (the data) with a given format. Changing or varying how the software operates on the data to give a different result (i.e., printing "Hello World" in a different format) requires changing the software 120.

By contrast, as noted hereinabove, the rendering handler (1060 in FIG. 1) may assemble context-adapted software 112 developed according to a preferred embodiment of the present invention, much more flexibly. The present invention employs a technique similar to web page design where developers use markup to describe the semantics of annotated (marked-up) text. Analogous to HTML, where, one may use CSS to separately describe the markup semantics; the SIs provide alternate SPSS implementations that the rendering handler 1060 uses in creating context-adapted software 112.

In the example of FIG. 4B, the rendering handler 1060 may assemble the same single set of SPSSs 108 into a Java™ realization 1120, a Ruby programming language realization 1122, a simple realization 1124 or a fancy realization 1126. So, in this example, printing 122 the data "Hello World" provides different results, e.g., 124 and 126, depending upon the SIs 1124 and 1126 chosen. Further, the rendering handler 1060 assembles these variants without modifying the SPSSs, simply by choosing different appropriate SIs 1120, 1122, 1124 and 1126 from SI handler 1080.

Over time, new SIs—reflecting new languages, libraries, features—are written and stored in SI handler 1080. Moreover, these new SIs may be distributed "virally," propagating across a network of service hubs in a network or networks, e.g., across the world-wide web. These new SIs may be opportunistically used in assembling context-adapted software, based on semi-automated evaluation by the inspection handler 1100. The inspection handler 1100 may consider the relative risks and value associated with replacing an existing SI implementation with a new one.

It should be noted that in addition to producing an instance of context-adapted software, the rendering handler 1060 could also produce a summary of the context specification upon which the context-adapted software is based. This summary can include both the full current context specification, but also an indication of the actual usage levels, this information drawn from the evolving context information handler 1110. For example, a given context specification might indicate that the context-adapted software must be able to support of graphic files of up to 1 GB. In contrast, the evolving context information handler 1110 might show that no file greater that 10 MB was ever processed. Therefore, the context specification summary produced by the rendering handler 1060 would include both the required value of 1 GB and the actual value of 10 MB. Also, since the context specification for each version of context-adapted software changes with each evolutionary cycle's updates from the inspection handler 1100, the relevant context specification may differ greater from that specified for the first version. Thus advantageously, one may obtain the actual summary context specification for a later version of context-adapted software. Information such as that included in such a context specification summary facilitates resource planning related to the use of the context-adapted software.

Advantageously, the present invention simplifies retargeting existing software to a more modern programming language(s), libraries, components, operating systems, or other underlying functionality. Further, after retargeting new DCCs non-invasively replacing the previously created DCCs. Thus, the useful life of existing applications is extended beyond the life of the original programming language, libraries, components, operating systems, or other underlying functionality in which the application happened to be implemented. Life support costs are dramatically reduced because older applications can be regenerated using newer languages that do not require support by personnel experienced in otherwise obsolete technology. Moreover, the present invention provides up to date software tailored to current needs by continually monitoring, adapting and distributing software in response to changes in the context as they occur and are encountered. Thus, development costs associated with modifying existing applications to meet context changes are avoided by simply reassembling the application based on updated contexts and redistributing the updated version.

While the invention has been described in terms of preferred embodiments, those skilled in the art will recognize that the invention can be practiced with modification within the spirit and scope of the appended claims. It is intended that all such variations and modifications fall within the scope of the appended claims.

What is claimed is:

1. A software evolution system comprising:
    a context specification handler storing context specifications in a memory describing software requirements;
    a Software Part Semantics Specification (SPSS) handler storing in said memory software part semantics specifications;
    a Software Implementation (SI) handler storing SIs in said memory;
    a Behavior History handler storing in said memory a history of behavior analysis results of a previous versions of active context-adapted software; and
    a software rendering handler assembling new versions of context-adapted software from software behavior history, context specifications, software part semantics specifications and software implementations;
    said software rendering handler further deploys assembled said new versions of said context-adapted software; a software inspector monitoring handler continuously monitors the new versions of assembled said context-adapted software and analyzes behavior and execution characteristics; wherein said software inspector monitoring behavior determines whether assembled software satisfies requirements in a respective said context specification; said software inspector identifies assembled context-adapted software determined failing to satisfy requirements, said software rendering handler reassembling said assembled software modified to address identified failings.

2. The software evolution system as in claim 1, wherein said context specifications include performance requirements, network configuration, expected load.

3. The software evolution system as in claim 2, wherein said context specifications further describe an operating context for software being assembled by said software rendering handler, said context specifications driving software assembly.

4. The software evolution system as in claim 1, wherein a software inspector monitoring behavior determines whether actual usage or contextual requirements for assembled software match the respective context specification.

5. The software evolution system as in claim 4, wherein said software inspector identifies assembled context-adapted software for reassembly responsive to identifying changes in contextual requirements, the software rendering handler reassembling software modified to address identified contextual requirements changes.

6. The software evolution system as in claim 5, wherein the software rendering handler additionally provides an indication of the current context specification with an updated context specification summary including a list of all of the additions and changes made by the inspection handler to an existing context specification.

7. A computer program product for evolving software, said computer program product comprising a non-transitory computer usable medium having computer readable program code stored thereon, said computer readable program code comprising:
    computer readable program code providing context specifications describing software requirements;
    computer readable program code receiving Software Part Semantics Specifications (SPSSs), said SPSSs being software part semantics specifications;

computer readable program code defining Software Implementations (SIs);

computer readable program code maintaining a history of results of behavior analysis of previously deployed rendered context-adapted software versions; and computer readable program code combining software behavior history with one or more of said context specifications, one or more of said software part semantics specifications and one or more of said SIs to assemble new versions of context-adapted software, and for distributing said new versions of said context-adapted software;

computer readable program code continuously monitoring the new versions of combined said context-adapted software and analyzes behavior and execution characteristics; wherein monitoring behavior determines whether combined software satisfies requirements in a respective said context specification; said continuously monitoring identifies assembled context-adapted software determined failing to satisfy requirements, recombining said combined software modified to address identified failings.

8. The computer program product for evolving software as in claim 7, wherein said computer readable program code providing said context specifications describe context specific software requirements and include computer readable program code providing performance requirements, network configuration and, expected load.

9. The computer program product for evolving software as in claim 8, wherein said computer readable program code providing said context specifications further include computer readable program code describing an operating context for software being assembled and for driving software assembly.

10. The computer program product for evolving software as in claim 7, wherein said computer readable program code continuously monitoring determines whether actual usage requirements or contextual requirements for assembled software match the respective current context specification.

11. The computer program product for evolving software as in claim 10, wherein said computer readable program code continuously monitoring identifies deployed context-adapted software for reassembly responsive to identifying changes in contextual requirements, identified said software being reassembled to address identified contextual requirements changes.

12. The computer program product for evolving software as in claim 7, the computer readable program code combining comprising computer readable program code selectively assembling multiple realizations of the same software application, each realization targeted to address particular software and environmental contextual requirements.

13. A computer implemented method of evolving software comprising:

a context specifications describing software requirements;
a Software Implementation (SI);

a history of results of behavior analysis of previously deployed context-adapted software versions;

receiving Software Part Semantics Specification (SPSS) comprising semantics specification for constructing an application;

selecting received SPSSs guided by said context specifications;

assembling one or more new versions of said context-adapted software from software behavior history, context specifications, selected SPSSs and Software Implementations (SIs); and distributing said one or more said new versions of said context-adapted software;

continuously monitoring said new versions of assembled said context-adapted software and analyzes behavior and execution characteristics; wherein monitoring behavior determines whether assembled software satisfies requirements in a respective said context specification; said continuously monitoring identifies assembled context-adapted software determined failing to satisfy requirements, reassembling said assembled software modified to address identified failings.

14. The method of evolving software as in claim 13, further comprising:

continuously monitoring behavior of active said context-adapted software to determine whether a current version requires an update; and responsive to identifying requirement of an update updating a behavior history and said context specifications to indicate identified failures and changes from said current version; and returning to reassemble one or more new versions further guided by said behavior history.

15. The method of evolving software as in claim 13, wherein said context specifications and monitored behavior include performance requirements, network configuration, and expected load.

16. The method of evolving software as in claim 15, wherein assembling is driven responsive to said context specifications, and said context specifications further describe an up-to-date operating context for software being assembled by said software rendering handler.

17. The method of evolving software as in claim 16, wherein continuously monitoring behavior comprises identifying whether said context-adapted application satisfies current requirements in respective said context specifications and identifying changes to application context and environment, and behavior history is updated responsive to failure to satisfy said requirements or to identifying changes.

18. The method of evolving software as in claim 13, wherein assembling comprises assembling multiple realizations of the same software application, each targeted to address particular software and environmental contextual requirements and distributing each realization.

* * * * *